United States Patent
Lee et al.

(10) Patent No.: US 8,285,286 B2
(45) Date of Patent: Oct. 9, 2012

(54) APPARATUS AND METHOD FOR RANDOM ACCESS IN WIRELESS COMMUNICATION SYSTEM

(75) Inventors: Neung Hyung Lee, Seongnam-si (KR); Soeng Hun Kim, Suwon-si (KR); Sung Oh Kwon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 209 days.

(21) Appl. No.: 12/752,749

(22) Filed: Apr. 1, 2010

(65) Prior Publication Data

US 2010/0255847 A1  Oct. 7, 2010

(30) Foreign Application Priority Data

Apr. 1, 2009 (KR) .................. 10-2009-0027958

(51) Int. Cl.
*H04W 36/00* (2009.01)
(52) U.S. Cl. ........ 455/436; 370/328; 370/331; 370/252; 455/522

(58) Field of Classification Search .......... 455/436–444; 370/328, 331, 252, 332, 333
See application file for complete search history.

(56) References Cited

U.S. PATENT DOCUMENTS

| | | | | |
|---|---|---|---|---|
| 2008/0310395 | A1* | 12/2008 | Kashima | 370/350 |
| 2009/0316653 | A1* | 12/2009 | Meyer et al. | 370/331 |
| 2010/0027438 | A1* | 2/2010 | Cai | 370/252 |
| 2010/0074204 | A1* | 3/2010 | Meylan | 370/329 |
| 2010/0172299 | A1* | 7/2010 | Fischer et al. | 370/328 |
| 2011/0002262 | A1* | 1/2011 | Wang et al. | 370/328 |
| 2011/0216705 | A1* | 9/2011 | Lee et al. | 370/328 |
| 2012/0002606 | A1* | 1/2012 | Vujcic | 370/328 |
| 2012/0008524 | A1* | 1/2012 | Amirijoo et al. | 370/252 |

* cited by examiner

Primary Examiner — Ajit Patel
(74) Attorney, Agent, or Firm — The Farrell Law Firm, P.C.

(57) ABSTRACT

A method and an apparatus are provided that transmit and receive a random access preamble in a wireless communication system. A plurality of random access parameters having different values in accordance with a plurality of events for triggering random access are set. When one of the plurality of events for triggering random access has occurred, random access is performed according to at least one of the plurality of random access parameters corresponding to the event. Therefore, the time delay of random access can be reduced.

9 Claims, 8 Drawing Sheets

APPARATUS AND METHOD FOR RANDOM ACCESS IN WIRELESS COMMUNICATION SYSTEM

PRIORITY

This application claims priority under 35 U.S.C. 119(a) to an application filed in the Korean Intellectual Property Office on Apr. 1, 2009, and assigned Serial No. 10-2009-0027958, the contents of which are incorporated herein by reference.

BACKGROUND OF THE INVENTION

1. Field of the Invention

The present invention relates generally to wireless communication systems, and more particularly, to a method and apparatus for transmitting and receiving a random access preamble in a wireless communication system.

2. Description of the Related Art

The terms handover and handoff are generally related to technology that automatically switches a call channel without loss or interruption of service when a mobile communication subscriber moves from one wireless communication area to another.

Random access is a collision-based access procedure that user equipment uses to initially access a base station. In the Third Generation Partnership Project (3GPP) Long Term Evolution (LTE) standard, random access is defined so that user equipment may rapidly access a base station using the least amount of wireless resources. A physical channel used to transmit a random access preamble is a Physical Random Access Channel (PRACH), and the remaining physical channel used for the signaling use is a shared cannel. An LTE system provides a non-contention-based random access procedure to minimize the use of resources and time delays due to collisions.

In performing random access, user equipment transmits a preamble to a base station, using the initial transmission power of the preamble contained in random access information. The random access information, as system information, is downloaded from the base station. When the user equipment successfully transmits the preamble and receives a random access response regarding the preamble from the base station, it can continue performing the procedure of random access. However, if the user equipment does not receive a response from the base station within a certain period of time, it re-transmits the preamble thereto using a transmission power that is higher than that of the previous transmission. This increase is referred to as 'power ramping.' The base station downloads the maximum transmission power and the increased amount of transmission power in the power ramping process, as system information, to the user equipment.

Figure 1:
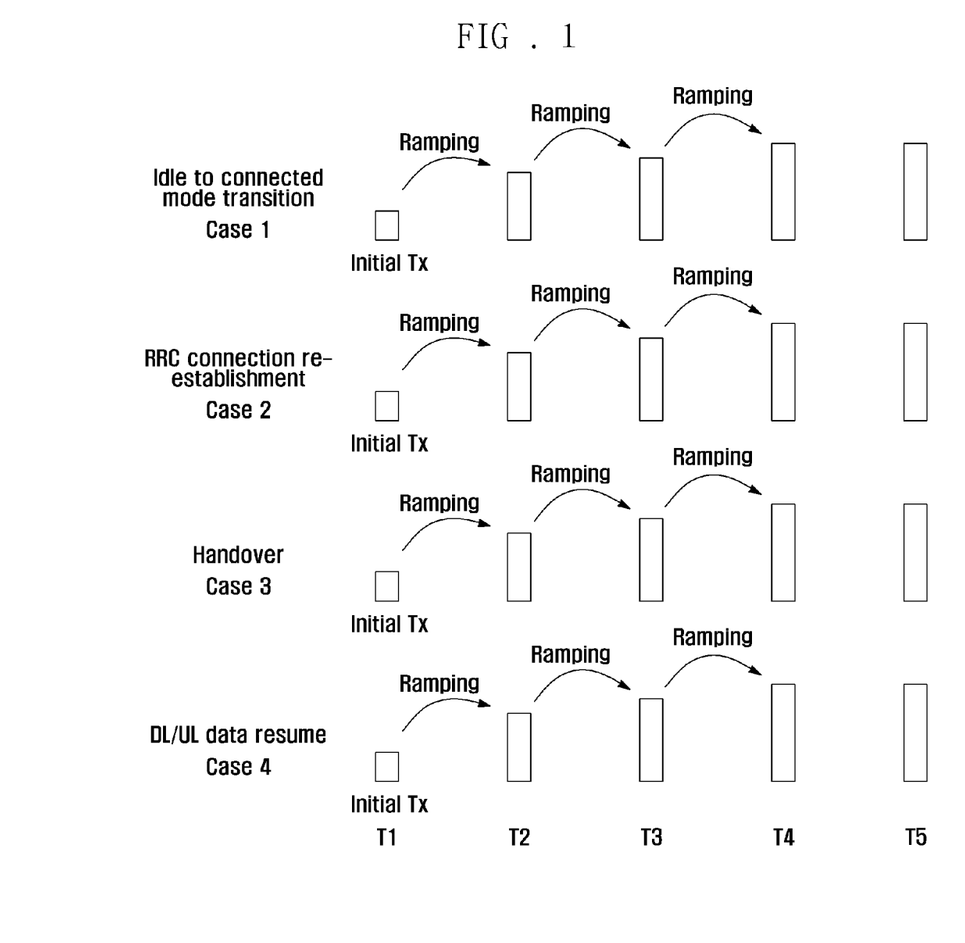
FIG. 1 is a diagram illustrating preamble transmission power in a general random access process.

FIG. 1 is a diagram illustrating preamble transmission power in a general random access process.

When an event (or a case) for triggering random access has occurred, user equipment transmits a preamble to a base station. As shown in FIG. 1, the events (or cases) include idle to connected mode transition (Case 1), Radio Resource Control (RRC) connection re-establishment (Case 2), handover (Case 3), and DownLink/UpLink (DL/UL) data resume (Case 4). As shown in FIG. 1, the general random access process is performed using the same initial transmission power and ramping power.

If a user equipment and a base station are located near each other, the user equipment can transmit a preamble to the base station using a relatively low level of transmission power. On the contrary, if the user equipment is located at a cell edge furthest from the base station, and transmits a preamble to the base station using a relatively low level of transmission power, the base station may fail to receive the preamble. In that case, the user equipment increases transmission power to transmit the preamble and repeats the re-transmission attempt, which requires more time to perform the random access process.

SUMMARY OF THE INVENTION

The present invention has been made to address at least the above problems and/or disadvantages and to provide at least the advantages described below. Accordingly, an aspect of the present invention provides a method and apparatus that can properly allocate random access preamble transmission power in a wireless communication system, based on events for triggering random access or cases where random access needs to be performed, thereby reducing time delay due to random access.

According to one aspect of the present invention, a random access method of a user equipment is provided. A plurality of random access parameters having different values in accordance with a plurality of events for triggering random access are set. When one of the plurality of events for triggering random access has occurred, random access is performed according to at least one of the plurality of random access parameters corresponding to the event.

According to another aspect of the present invention, a random access apparatus is provided. The random access apparatus includes a storage unit for storing a plurality of random access parameters that differ from each other according to a plurality of events for triggering random access. The random access apparatus also includes a random access preamble configuration unit for generating a random access preamble when one of the plurality of events for triggering random access has occurred. The random access apparatus additionally includes a user equipment communication unit for transmitting the random access preamble. The random access apparatus further includes a random access preamble power controller for controlling a transmission power of the random access preamble according to at least one of the plurality of random access parameters stored in the storage unit.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar reference numbers are used throughout the drawings to refer to the same or similar parts. Detailed descriptions of well-known functions and structures incorporated herein may be omitted to avoid obscuring the subject matter of the present invention.

A description is provided regarding transmission power of a random access preamble (hereinafter, 'preamble') according to an embodiment of the present invention.

Figure 2:
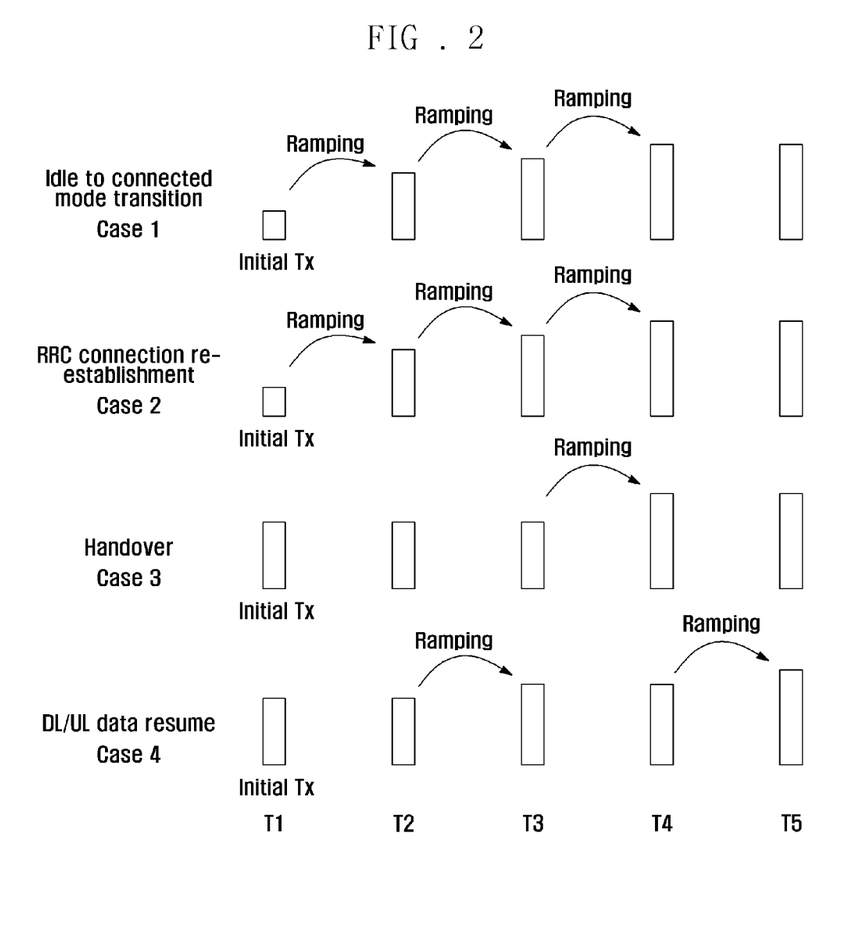
FIG. 2 is a diagram illustrating preamble transmission power in a random access process, according to an embodiment of the present invention.

FIG. 2 is a diagram illustrating preamble transmission power in a random access process, according to an embodiment of the present invention.

When an event for triggering random access has occurred, user equipment transmits a random access preamble to a base station.

In an embodiment of the present invention, before the user equipment transmits the preamble to the base station, the base station transmits, to the user equipment, parameters for performing the random access corresponding to an event (or case) for triggering the random access.

The events (or cases) include idle to connected mode transition (Case 1), RRC connection re-establishment (Case 2), handover (Case 3), and DL/UL data resume (Case 4). The base station previously transmits random access parameters, set differently in accordance with the cases described above, to the user equipment.

The random access parameters include initial transmission power Preamble_Intial_Power_n, ramping power Ramping_Power_n, maximum transmission power Max_Preamble_power_n, backoff window Backoff_Window_n, retrial number Retrial_number_n, and maximum number of re-transmission Max_Total_Tx_Num.

The initial transmission power Preamble_Intial_Power_n refers to a transmission power value of a preamble that is initially transmitted by each of the random access trigger events.

The ramping power Ramping_Power_n refers to a transmission power value that is increased when ramping is performed. The ramping process means that a preamble is re-transmitted using a transmission power that is higher than that of the process of transmitting the preamble in the previous step.

The maximum transmission power Max_Preamble_power_n refers to the maximum value to which preamble transmission power may be increased by the ramping process when a preamble is re-transmitted.

The backoff window Backoff_Window_n refers to a standby time between when a preamble has been transmitted and when the preamble is re-transmitted.

The retrial number Retrial_number_n refers to the number of preamble transmissions maintaining the same transmission power as the previous transmission without the ramping process. If more re-transmissions are performed than the retrial number, transmission power needs to be increased by the ramping power.

The maximum re-transmission number Max_Total_Tx_Num refers to the maximum value of re-transmissions that may be performed for a preamble. If the number of preamble re-transmissions reaches the maximum re-transmission number, the preamble cannot be transmitted via the re-transmission.

As shown in FIG. 2, preamble transmission power according to the random access parameters described above is illustrated by events (or cases) that trigger random access. Symbols T1 to T5 indicate first to fifth transmissions.

In Case 1 (Idle to connected mode transition) and Case 2 (RRC connection re-establishment), transmission power is relatively low in the initial transmission of a preamble. Since it is difficult to detect where user equipment is located in a cell of a serving base station, transmission power is gradually increased from its low value when an initial transmission of a preamble is performed. In addition, the preambles are transmitted one by one using the same transmission power.

On the other hand, in Case 3 (handover) and Case 4 (DL/UL data resume), transmission power is relatively high in an initial transmission of a preamble. Since user equipment and a base station are relatively further apart from each other than in the other cases, the initial transmission of a preamble is performed using high transmission power so that there is a high probability that the base station will receive the preamble.

In Case 3 (handover), since the user equipment needs to transmit a preamble at a cell edge between a serving base station and a target base station, it is set in such a way that it increases transmission power to a relatively high level in the initial transmission of the preamble. It is also set in such a way that the preamble is transmitted three times using the same transmission power.

In Case 4 (DL/UL data resume) the UL or DL data transmission between the user equipment and the serving base station is temporally interrupted and then resumed when a handover is performed. To this end, the user equipment is set in such a way that the initial transmission power of the preamble is relatively high and the number of preamble re-transmissions using the same transmission power is two.

As shown in FIG. 2, the number of preamble re-transmissions can be reduced by properly setting transmission power according to events (cases) and then performing preamble transmission for random access. This can also reduce the time delay to perform random access.

Figure 3:
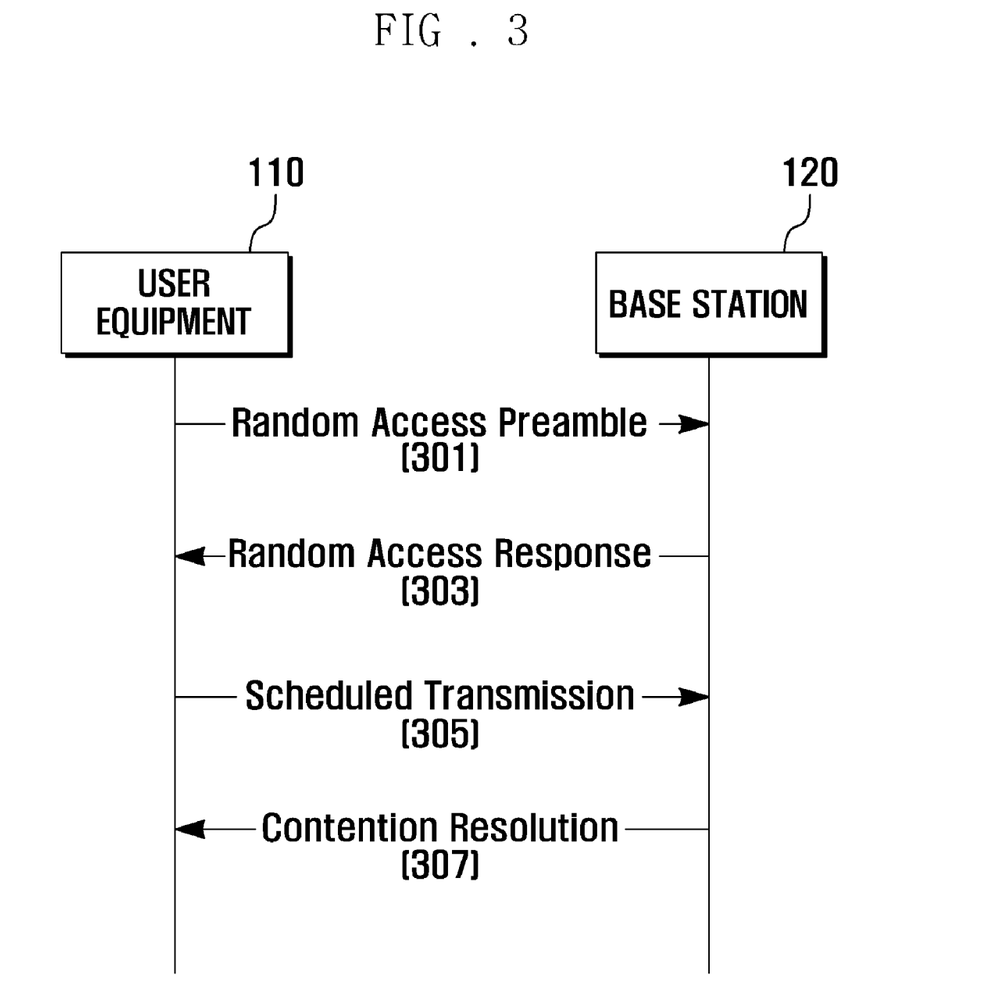
FIG. 3 is a signal flow chart illustrating a random access method in a wireless communication system, according to an embodiment of the present invention.

FIG. 3 is a signal flow chart illustrating a random access method in a wireless communication system, according to an embodiment of the present invention.

It is assumed that a base station 120 has already transmitted random access parameters corresponding to events to a user equipment 110, where the parameters are the same as FIG. 2.

Referring to FIG. 3, when an event for trigging random access has occurred, the user equipment 110 transmits a random access preamble to the base station 120 using transmission power corresponding to the event in step 301. For example, as shown in FIG. 2, if the event corresponds to a handover case, the user equipment 110 transmits the preamble to the base station 120, using relatively high transmission power in the initial transmission. If the event corresponds to an RRC connection re-establishment case, the user equipment 110 transmits the preamble to the base station 120, using a relatively low level of transmission power in the initial transmission.

When the base station 120 has received the preamble and successfully decodes it, the base station 120 transmits a random access response to the user equipment 110 in step 303. When the base station 120 has not received the preamble and cannot decode it, the base station 120 does not transmit a random access response to the user equipment 110.

If the user equipment 110 has not received a random access response from the base station 120, it waits for a time corresponding to the backoff window Backoff_Window_n, and then re-transmits the preamble to the base station 120. Each time that the user equipment 110 has not received a random access response after transmitting or re-transmitting a preamble to the base station 120, it repeats re-transmission a preset number of times.

The user equipment 110 re-transmits the preamble using ramping power corresponding to the event for triggering random access.

For example, as shown in FIG. 2, if the event corresponds to Case 1 (idle to connected mode transition) or Case 2 (RRC connection re-establishment), the user equipment 110 increases transmission power by a preset ramping power each time that re-transmission (T2~T4) is performed.

If the event corresponds to Case 3 (handover), the user equipment 110 repeatedly re-transmits the preamble using the same transmission power as the previous transmission a certain number of times, and then increases transmission power to re-transmit the preamble.

If the event corresponds to Case 4 (DL/UL data resume), the user equipment 110 increases transmission power by a preset ramping power to transmit the preamble at the third and fifth transmissions (T3 and T5).

In an embodiment of the present invention, it is assumed that the base station 120 has successfully received the preamble from the user equipment 110 and transmitted the random access response to the user equipment 110 in step 303. The random access response contains a time alignment, to synchronize timing between the user equipment 110 and the base station 120. The random access response also contains information regarding transmission resources allocated so that the user equipment 110 can transmit messages.

When the user equipment 110 has received the random access response, it transmits a scheduled transmission message, containing its identifier, to the base station 120 in step 305. The base station 120 receives the scheduled transmission message and transmits a connection resolution message to the user equipment 110 in step 307. The base station 120 can receive the schedule transmission message from a plurality of user equipments and then transmit a content resolution message as a response to them.

A description is provided regarding a method for transmitting random access parameters from the base station 120, where the random access parameters are set differently according to events that trigger random access. The parameters may be transmitted via various methods before the events occur. In addition, the parameters may be previously stored in both the user equipment 110 and the base station 120. Examples of methods for transmitting the parameters before the events occur are described in greater detail below.

Figure 4:
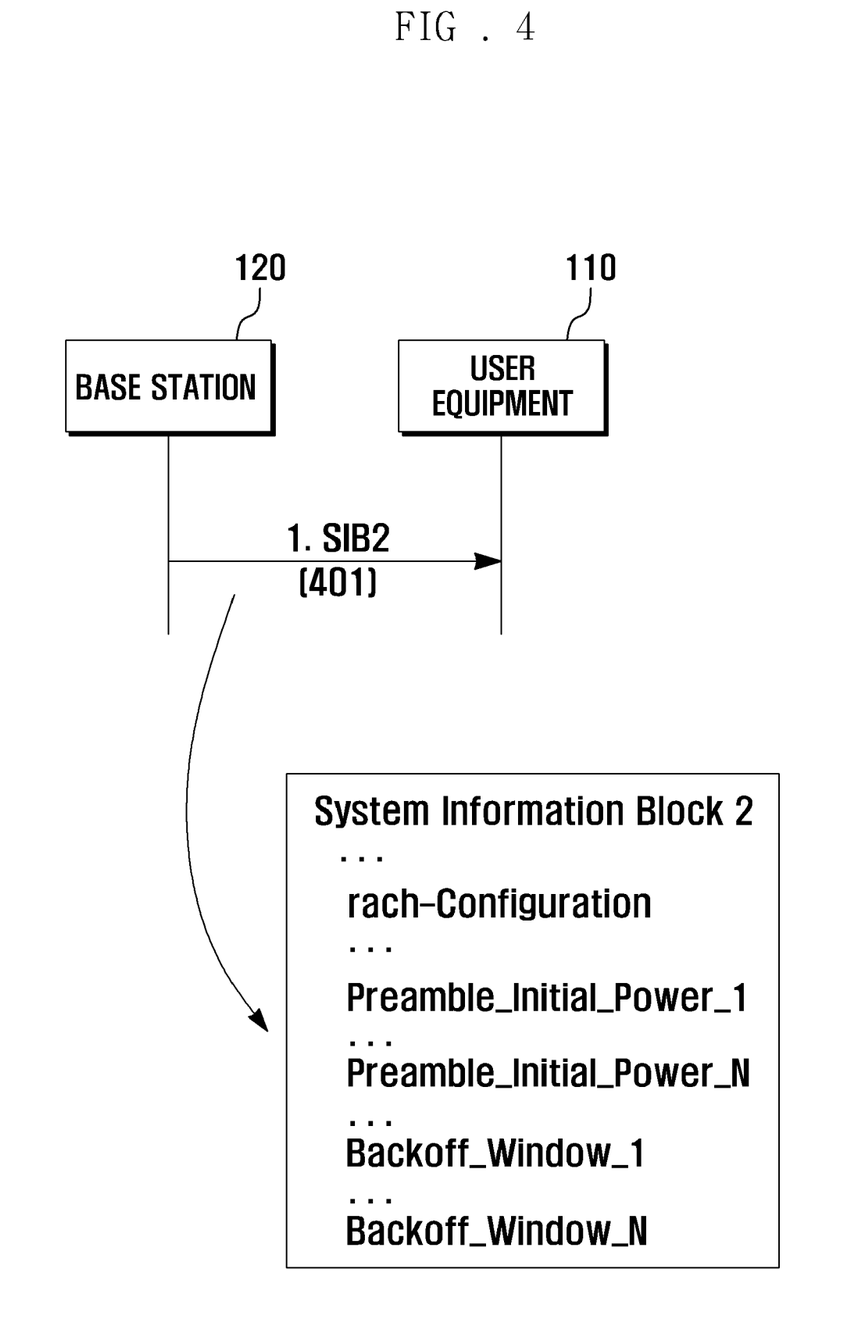
FIG. 4 is a signal flow chart illustrating a method for setting random access parameters, according to an embodiment of the present invention.

FIG. 4 is a signal flow chart illustrating a method for setting random access parameters, according to an embodiment of the present invention.

The base station 120 transmits system information, for example, System Information Block 2 (SIB2), to the user equipment 110 in step 401. The system information contains random access parameters described above.

Table 1 shows an example of the random access parameters included in the system information according to an embodiment of the present invention.

TABLE 1

| System Information Block 2 |
|---|
| rach-Configuration |
| Preamble_Initial_Power_1 |
| ...... |
| Preamble_Initial_Power_n |
| ... |
| Backoff_Window_1 |
| ..... |
| Backoff_Window_n |

As described in Table 1, the random access channel configuration information of the system information, rach-Configuration, includes random access parameters. Table 1 shows only the random access parameters, Preamble_Initial_Power_n and Backoff_Window_n, which are defined by corresponding events (or cases). For example, the parameters of the initial transmission power, Preamble_Initial_Power, are defined as Preamble_Initial_Power_1, Preamble_Initial_Power_2, . . . , Preamble_Initial_Power_n, according to corresponding events (cases) 1, 2, . . . , n.

The user equipment 110 receives the system information and stores random access parameters contained therein. When an event for triggering random access has occurred, the user equipment 110 performs random access according to a parameter corresponding to the event.

Figure 5:
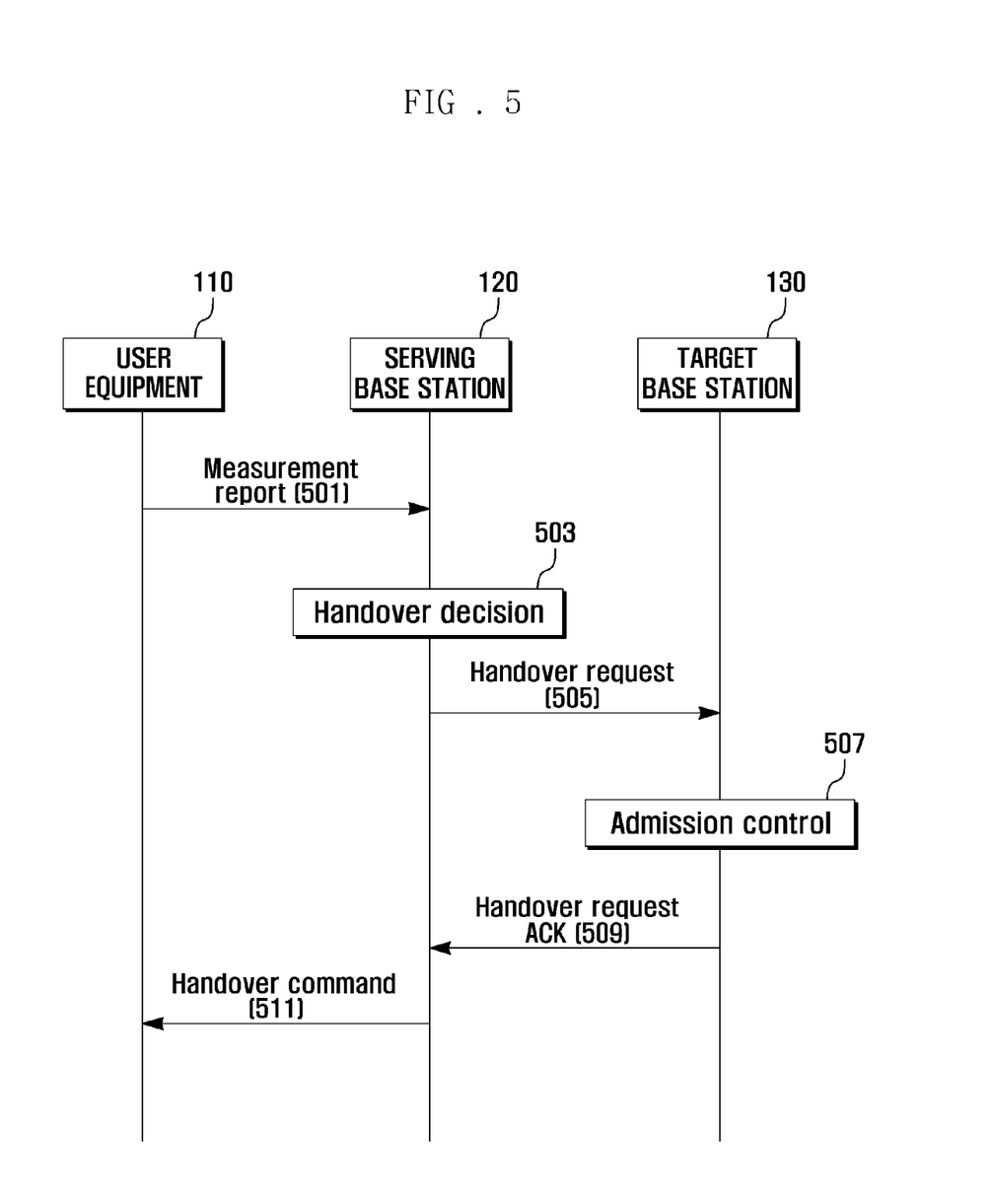
FIG. 5 is a signal flow chart illustrating a method for setting random access parameters, according to another embodiment of the present invention.

FIG. 5 is a signal flow chart illustrating a method for setting random access parameters, according to another embodiment of the present invention.

The method for setting random access parameters is provided based on the user equipment 110, the serving base station 120 and a target base station 130.

When an event for triggering a handover has occurred, the user equipment 110 measures the Reference Signal Received Power (RSRP) from its peripheral base stations and then transmits a measurement report message to the serving base station 120 in step 501. For example, the event for triggering a handover may be a case where the RSRP of the peripheral base stations is greater, by a preset offset, than that of the serving base station 120, and is maintained over a preset time period. The event may also be a case where the RSRP of the peripheral base stations is equal to or greater than a preset threshold.

The serving base station 120 receives the measurement report message from the user equipment 110 and determines a handover in step 503. The serving base station 120 performs a handover request from the target base station 130 in step 505.

The target base station 130 performs admission control to determine whether it can admit the user equipment 110 in step 507. If the target base station 130 can admit the user equipment 110, it transmits a handover request ACK message indicating that it can perform a handover to the serving base station 120 in step 509.

The serving base station 120 transmits a handover command to the user equipment 110 so that the user equipment 110 can perform the handover in step 511. The handover command may be an RRC connection re-establishment message. This RRC connection re-establishment message contains random access parameters.

Specifically, the base station transmits random access parameters to the user equipment 110 via the handover command.

Table 2 shows an example of random access parameters contained in the handover command according to an embodiment of the present invention.

TABLE 2

| RRC Connection Reconfiguration |
|---|
| ..... |
| mobilityControlInformation |
| rach-Configuration |
| .... |
| Preamble_Initial_Power_n |
| ..... |
| Backoff_Window_n |
| ..... |

As described in Table 2, the random access channel configuration information of the handover command, rach-Configuration, contains random access parameters. Table 2 shows only the random access parameters, Preamble_Initial_Power_n and Backoff_Window_n. Unlike Table 1, Table 2 describes that only random access parameters are transmitted when a handover occurs. This is because the event for triggering random access corresponds to a handover. Alternatively, the serving base station 120 may transmit random access parameters by events.

The user equipment 110 receives the handover command and stores random access parameters contained therein. When an event for triggering random access has occurred, the user equipment 110 performs random access according to a parameter corresponding to the event.

Although embodiments of the present invention are implemented in such a way that the random access parameters are set differently according to events (cases) for triggering random access, they may be modified so that the parameters are further set according to user equipment. For example, the user equipment 110 measures the RSRP from the base station 120, reflects the path loss between the user equipment 110 and the base station 120, according to the measured value, and sets the initial transmission power Preamble_Initial_Power_n_i through the user equipment. The symbol i represents an index to identify user equipment.

The user equipment 110 can measure an RSRP from the serving base station 120 or its peripheral base stations.

The path loss between the user equipment 110 and the base station 120 can be estimated via the RSRP. If the RSRP is relatively high, the initial transmission power Preamble_Initial_Power_n_i set by user equipment is increased to transmit a preamble in the initial transmission. On the contrary, if the RSRP is not relatively high, the initial transmission power Preamble_Initial_Power_n_i set by user equipment is decreased to transmit a preamble in the initial transmission. It is preferable that this method is applied to the handover (Case 3) and the DL/UL data resume (Case 4).

When a handover is performed, the user equipment 110 measures the RSRP of the serving base station 120 and peripheral base stations and transmits the measured RSRP to the serving base station 120. The user equipment 110 does not need an additional process. The initial transmission power by user equipment, to which the path loss has been applied, Preamble_Initial_Power_n_i, can be determined by user equipment or by the base station according to the measurement report transmitted to the base station.

At the UL/DL data resume, if the base station determines the initial transmission power by user equipment, to which the path loss has been applied, Preamble_Initial_Power_n_i, the user equipment does not need the measurement report.

The following description is provided regarding an operation where the user equipment transmits a preamble to the base station 120 according to the random access parameters described above and the base station 120 receives the preamble.

Figure 6:
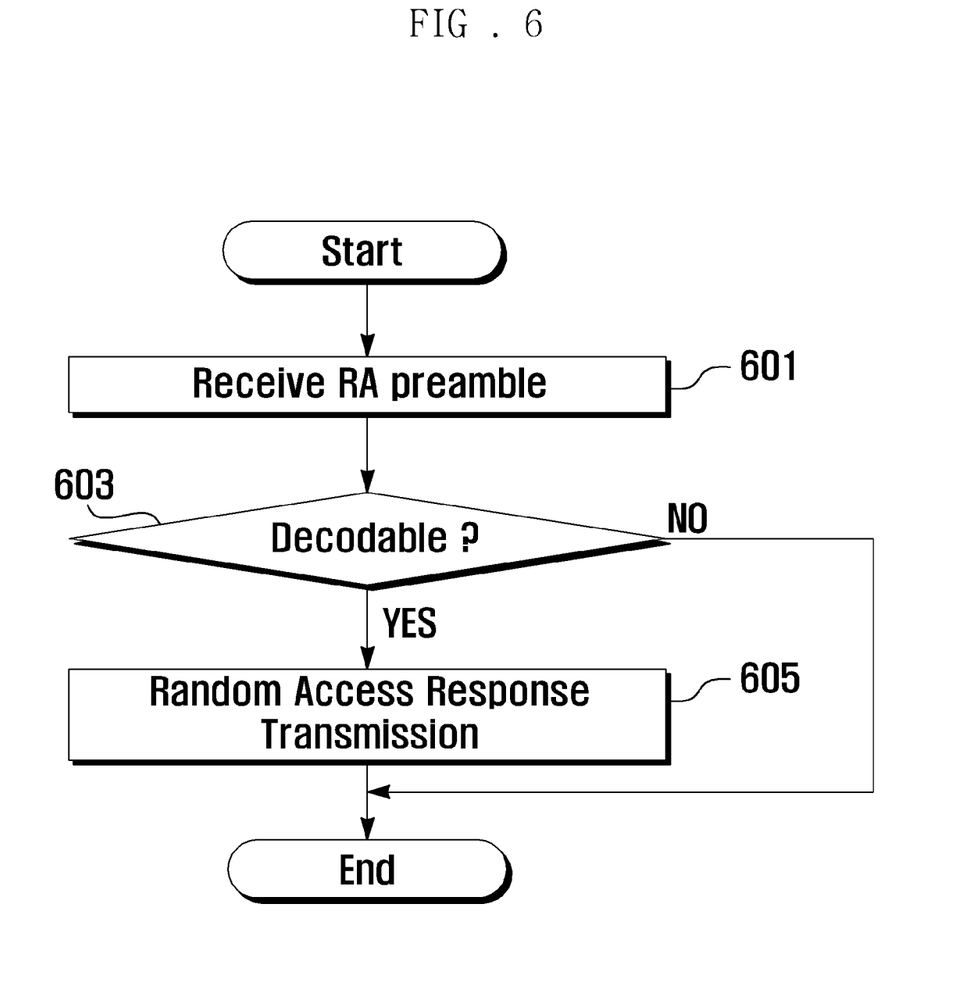
FIG. 6 is a flow chart illustrating a method for receiving preamble of a base station, according to an embodiment of the present invention.

FIG. 6 is a flow chart illustrating a method for receiving a preamble of a base station, according to an embodiment of the present invention.

When an event for triggering random access has occurred, the user equipment 110 transmits a preamble to the base station 120. The base station 120 receives the preamble in step 601, and decodes the received preamble in step 603. If the base station 120 has successfully decoded the preamble at step 603, it transmits a random access response with respect to the received preamble to the user equipment 110 in step 605. The random access response includes a time alignment, to synchronize timing between the user equipment 110 that transmitted the preamble and the base station 120. The random access response also includes information regarding transmission resources allocated to corresponding user equipment.

If the base station 120 did not decode the preamble at step 603, it ignores the received preamble and terminates the procedure.

Figure 7:
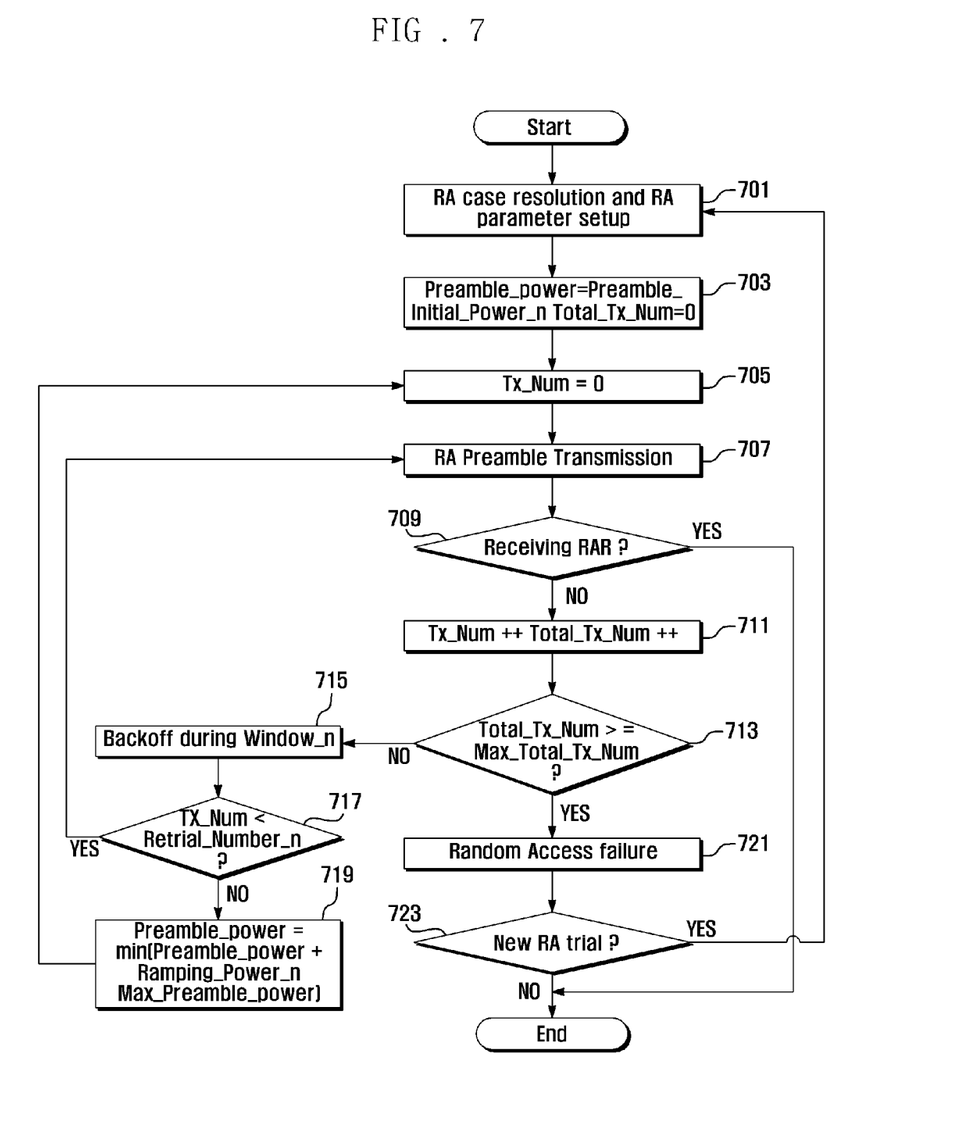
FIG. 7 is a flow chart illustrating a method for transmitting a preamble of user equipment, according to an embodiment of the present invention.

FIG. 7 is a flow chart illustrating a method for transmitting a preamble of user equipment, according to an embodiment of the present invention. It is assumed that an event for triggering random access has occurred.

The user equipment 110 determines random access parameters according to the event in step 701. The user equipment 110 has previously received and stored the random access parameters, as described in FIGS. 4 and 5. Specifically, the user equipment 110 determines one of the stored parameters, corresponding to the event.

The user equipment 110 sets the initial transmission power Preamble_Initial_Power_n according to the determined parameter and then sets the total number of preamble transmissions Total_Tx_Num to zero in step 703. The user equipment 110 sets the number of transmissions Tx_Num to zero in step 705.

The user equipment 110 transmits the random access preamble to the base station 120 in step 707. The transmission power for the preamble is established according to the settings described above.

The user equipment 110 checks whether it receives a random access response to a previously transmitted preamble in step 709.

If the user equipment 110 ascertains that it has not received a random access response at step 709, it increases the total number of preamble transmissions Total_Tx_Num and the number of transmissions Tx_Num by one in step 711.

The user equipment 110 determines whether the total number of preamble transmissions Total_Tx_Num is equal to or greater than the maximum number of transmissions Max_Total_Tx_Num in step 713.

If the user equipment 110 ascertains that the total number of preamble transmissions Total_Tx_Num is less than the maximum number of transmissions Max_Total_Tx_Num at step 713, it waits for a time indicated by a parameter, backoff window, in step 715. When the time indicated by the backoff window has elapsed at step 715, the user equipment 110 determines whether the number of transmissions Tx_Num is less than the retrial number Retrial_number_n in step 717.

If the user equipment 110 ascertains that the number of transmissions Tx_Num is less than the retrial number Retrial_number_n at step 717, it returns to and proceeds with step 707 where it transmits the preamble using the same transmission power as the previous transmission. Steps 717 and 707 may be explained as follows, referring to FIG. 3. Specifically, if the event for triggering random access corresponds to the UL/DL data resume (Case 4), the second and fourth transmissions (T2 and T4) of the preamble can be performed using the same transmission power as the previous transmission.

However, if the user equipment 110 ascertains that the number of transmissions Tx_Num is equal to or greater than the retrial number Retrial_number_n at step 717, it increases preamble transmission power by a ramping power, Ramping_Power_n, setting so as not to exceed the maximum preamble transmission power Max_Preamble_power in step 719. The user equipment 110 proceeds with step 705 where it set the number of transmissions Tx_Num to zero and then step 707 where it transmits the preamble using the transmission power set at 719. Steps 717, 719, 705 and 707 may be explained as follows, referring to FIG. 3. Specifically, if the event for triggering random access corresponds to the UL/DL data resume (Case 4), transmission power is increased by a preset ramping power when the third and fifth transmissions (T3 and T5) of the preamble are performed.

If the user equipment 110 ascertains that the total number of preamble transmissions Total_Tx_Num is equal to or greater than the maximum number of transmissions Max_Total_Tx_Num at step 713, it concludes that it fails random access in step 721 and then determines whether to newly perform random access in step 723. If the user equipment 110 decides to perform new random access at step 723, it returns to step 701. Otherwise, it terminates the procedure.

In addition, if the user equipment 110 ascertains that it has received a random access response at step 709, it terminates the procedure.

Figure 8:
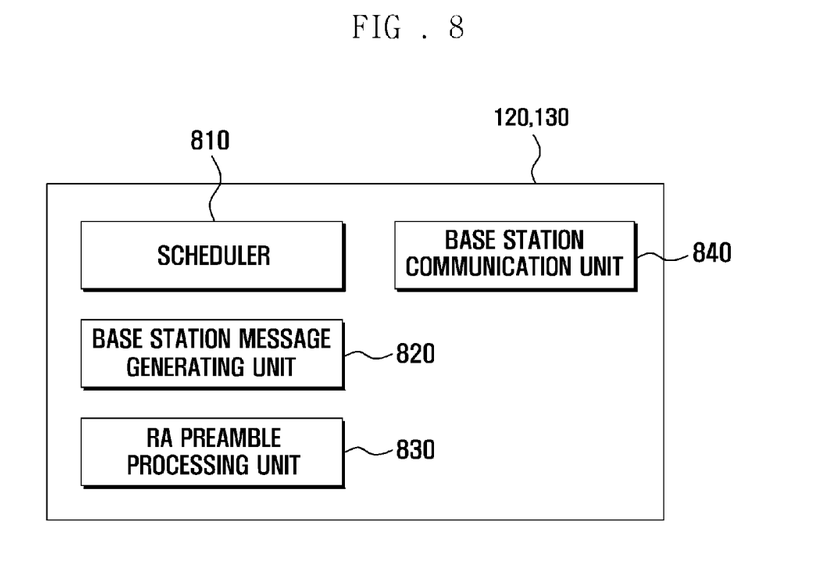
FIG. 8 is a schematic block diagram illustrating a random access apparatus of a base station, according to an embodiment of the present invention.

FIG. 8 is a schematic block diagram illustrating a random access apparatus of a base station, according to an embodiment of the present invention.

The random access apparatus of the base station 120 or 130 includes a scheduler 810, a base station message generating unit 820, an random access preamble processing unit 830, and a base station communication unit 840.

The scheduler 810 sets locations of user equipments to which a random access preamble is transmitted (transmission resources). The preamble may be transmitted via an RACH.

The base station message generating unit 820 sets random access parameters by events and the user equipment 110, and generates system information and signaling messages to inform the user equipment 110 of the parameters.

As described above, the random access parameters include initial transmission power Preamble_Intial_Power_n, backoff window Backoff_Window_n, the number of transmissions Tx_Num, retrial number Retrial_number_n, ramping power Ramping_Power_n, the total number of transmissions Total_Tx_Num, the maximum number of re-transmissions Max_Total_Tx_Num and the maximum transmission power Max_Preamble_power_n.

The random access preamble processing unit 830 receives and processes a random access preamble. Specifically, if the random access preamble processing unit 530 can successfully decode the received random access preamble, it generates a random access response and transmits it to the user equipment 110 via the base station communication unit 840.

The base station communication unit 840 wirelessly communicates with the user equipment 110. Specifically, the base station communication unit 840 receives the random access parameters from the base station message generating unit 820 and transmits them to the user equipment 110. The base station communication unit 840 also receives a random access response from the random access preamble processing unit 830 and transmits it to the user equipment 110. The base station communication unit 840 receives a random access preamble from the user equipment 110 and inputs it to the random access preamble processing unit 830.

Figure 9:
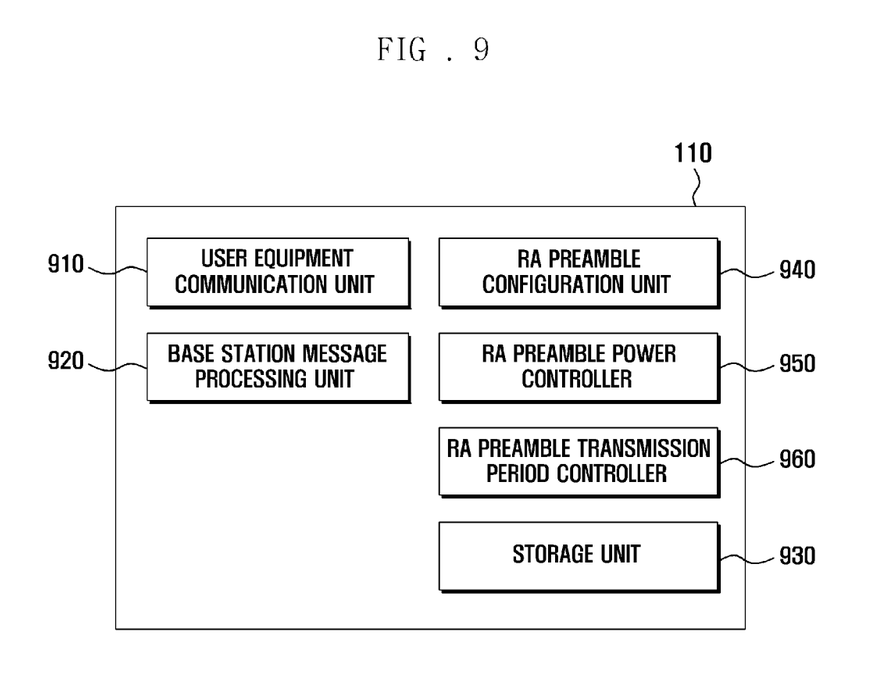
FIG. 9 is a schematic block diagram illustrating a random access apparatus of user equipment, according to an embodiment of the present invention.

FIG. 9 is a schematic block diagram illustrating a random access apparatus of user equipment, according to an embodiment of the present invention.

The random access apparatus of the user equipment 110 includes a user equipment communication unit 910, a base station message processing unit 920, a storage unit 930, a random access preamble configuration unit 940, a random access preamble power controller 950, and a random access preamble transmission period controller 960.

The user equipment communication unit 910 wirelessly communicates with the base station 120. Specifically, the user equipment communication unit 910 receives signaling messages and system information including random access parameters from the base station 120 and outputs them to the base station message processing unit 920.

The user equipment communication unit 910 transmits a preamble established by the random access preamble configuration unit 940 to the base station 120, using a transmission power according to the control of the random access preamble power controller 950.

If the user equipment communication unit 910 does not receive a response to the transmitted preamble from the base station 120, it re-transmits the preamble to the base station 120, using transmission power according to the control of the random access preamble power controller 950.

When the base station message processing unit 920 receives signaling messages and system information from the base station 120, it extracts random access parameters from the received signaling messages and system information and stores them in the storage unit 930.

The storage unit 930 stores the random access parameters extracted from the signaling messages and system information. The random access parameters include initial transmission power Preamble_Intial_Power_n, backoff window Backoff_Window_n, the number of transmissions Tx_Num, retrial number Retrial_number_n, ramping power Ramping_Power_n, the total number of transmissions Total_Tx_Num, the maximum number of re-transmissions Max_Total_Tx_Num and the maximum transmission power Max_Preamble_power_n.

The random access preamble configuration unit 940 generates a random access preamble. Specifically, when an event for triggering random access has occurred, the random access preamble configuration unit 940 generates a random access preamble containing a random access identifier, random_Id.

The random access preamble power controller 950 controls transmission power of the random access parameter generated by the random access preamble configuration unit 940. Specifically, the random access preamble power controller 950 controls transmission power of a preamble, based on a random access parameter stored in the storage unit 930, according to an event (or case) for triggering random access.

The random access preamble transmission period controller 960 controls the transmission period of a preamble. Specifically, the random access preamble transmission period controller 960 waits for a time indicated by the backoff window, based on the random access parameter stored in the storage unit 930, according to the event (or case) for triggering random access, and then controls the user equipment communication unit 910 to re-transmit the preamble. When the preamble is re-transmitted, the random access preamble power controller 950 controls transmission power of the preamble based on the random access parameter stored in the storage unit 930.

As described above, methods and apparatuses for random access, according to the present invention, can set different power ramping and initial transmission power of a random access preamble, according to the condition of user equipment that is performing random access and power ramping. This reduces the time delay due to random access, which enhances the performance of the wireless communication system.

While the invention has been shown and described with reference to certain embodiments thereof, it will be understood by those skilled in the art that various changes in form and detail may be made therein without departing from the spirit and scope of the invention as defined in the appended claims.

What is claimed is:

1. A method for random access of user equipment, comprising the steps of:
   setting a plurality of random access parameters having different values in accordance with a plurality of events for triggering random access; and
   when one of the plurality of events for triggering random access has occurred, performing random access according to at least one of the plurality of random access parameters corresponding to the event,
   wherein the plurality of random access parameters include initial transmission power parameters and ramping power parameters, and
   performing the random access comprises:
   transmitting a preamble using a transmission power corresponding to an initial transmission power parameter corresponding to the event; and
   when a response corresponding to the preamble has not been received, increasing the transmission power by a ramping power corresponding to a ramping power parameter corresponding to the event and re-transmitting the preamble using the increased transmission power, and
   wherein the initial transmission power parameter corresponding to one of a handover event and an uplink or downlink data resume event is greater than the initial transmission power parameter corresponding to one of an idle to connected mode transition event and a Radio Resource Control (RRC) connection re-establishment event.

2. The method of claim 1, wherein:
   the plurality of random access parameters further comprise retrial number parameters; and
   re-transmitting the preamble comprises:
   when a response corresponding to the preamble has not been received, retransmitting the preamble using a same transmission power as a previous preamble transmission, for a number of re-transmissions corresponding to a retrial number parameter corresponding to the event before increasing the transmission power by the ramping power corresponding to the ramping power parameter corresponding to the event.

3. The method of claim 2, wherein:
   when the retrial number parameter corresponds to one of an idle to connected mode transition event and an RRC connection re-establishment event, the preamble is not re-transmitted using the same transmission power as the previous preamble transmission; and
   when the retrial number parameter corresponds to one of a handover event and an uplink or downlink data resume event, the preamble is retransmitted one or more times using the same transmission power as the previous preamble transmission.

4. The method of claim 1, wherein setting random access parameters comprises:
   receiving the random access parameters from a base station; and
   setting the random access parameters according to the received random access parameters.

5. An apparatus for random access in a user equipment, comprising:
   a storage unit for storing a plurality of random access parameters that differ from each other according to a plurality of events for triggering random access;
   a random access preamble configuration unit for generating a random access preamble when one of the plurality of events for triggering random access has occurred;
   a user equipment communication unit for transmitting the random access preamble; and
   a random access preamble power controller for controlling transmission power of the random access preamble according to at least one of the plurality of random access parameters stored in the storage unit,
   wherein the plurality of random access parameters include initial transmission power parameters and ramping power parameters, and
   wherein the user equipment communication unit transmits a preamble using a transmission power corresponding to an initial transmission power parameter corresponding to the event,
   wherein when a response corresponding to the preamble has not been received, the random access preamble power controller increases the transmission power by a ramping power corresponding to a ramping power parameter corresponding to the event and the user equipment communication unit re-transmits the preamble using the increased transmission power, and
   wherein the initial transmission power parameter corresponding to one of a handover event and an uplink or downlink data resume event is greater than the initial transmission power parameter corresponding to one of an idle to connected mode transition event and a Radio Resource Control (RRC) connection re-establishment event.

6. The apparatus of claim 5, further comprising:
   a random access preamble transmission period controller that waits for a time indicated by a backoff window, based on one of the plurality of random access parameters stored in the storage unit, and controls the user equipment communication unit to re-transmit the preamble.

7. The apparatus of claim 5, wherein:
   the random access parameters further comprise retrial number parameters and ramping power parameters; and
   when a response corresponding to the preamble has not been received, the RA preamble power controller retransmits the preamble using a same transmission power as a previous preamble transmission, for a number of re-transmissions corresponding to a retrial number parameter corresponding to the event before increasing the transmission power by a ramping power corresponding to a ramping power parameter corresponding to the event.

8. The apparatus of claim 7, wherein:
when the retrial number parameter corresponds to one of an idle to connected mode transition event and an RRC connection re-establishment event, the preamble is not retransmitted using the same transmission power as the previous preamble transmission; and
when the retrial number parameter corresponds to one of a handover event and an uplink or downlink data resume event, the preamble is retransmitted one or more times using the same transmission power as the previous preamble transmission.

9. The apparatus of claim 5, wherein:
the user equipment communication unit receives the random access parameters from a base station; and
the storage unit stores the received random access parameters.

* * * * *